Figure 1:
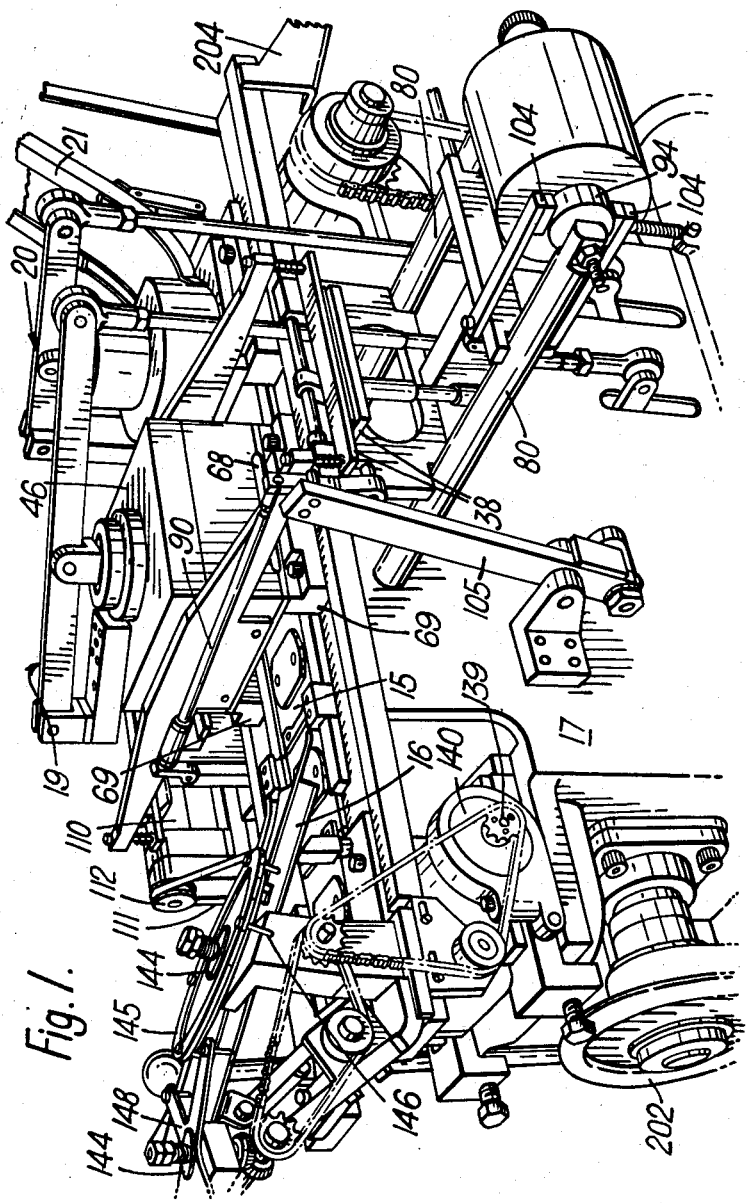

Dec. 24, 1963   F. E. MONKCOM   3,114,993
FOIL CUTTING MACHINES
Filed Nov. 14, 1960   6 Sheets-Sheet 1

Inventor
FRANK EDWARD MONKCOM
By Bacon & Thomas
Attorneys

Dec. 24, 1963  F. E. MONKCOM  3,114,993
FOIL CUTTING MACHINES
Filed Nov. 14, 1960  6 Sheets-Sheet 2
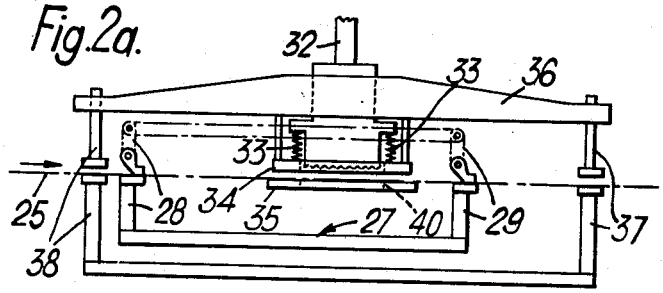
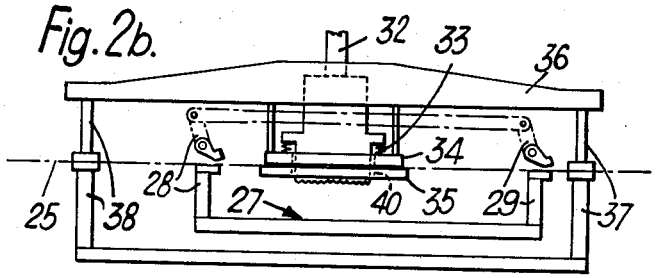
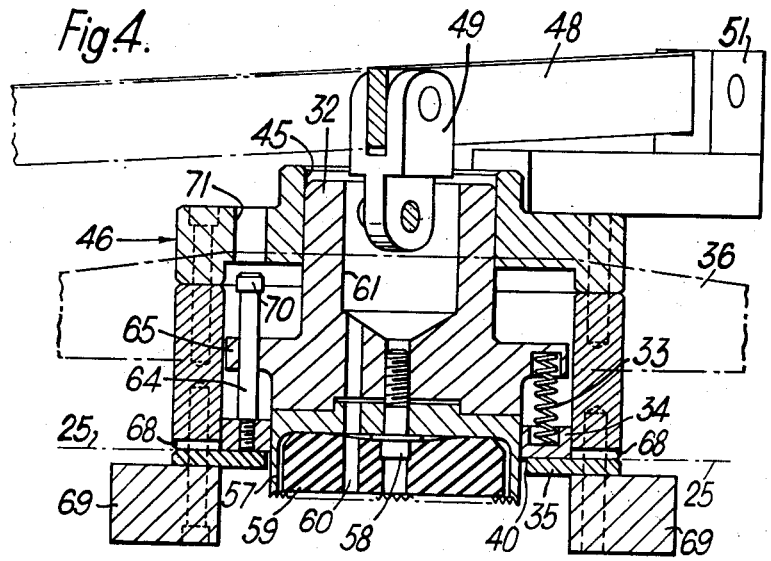
Inventor
FRANK EDWARD MONKCOM
By Bacon & Thomas
Attorneys Dec. 24, 1963  F. E. MONKCOM  3,114,993
FOIL CUTTING MACHINES
Filed Nov. 14, 1960  6 Sheets-Sheet 3
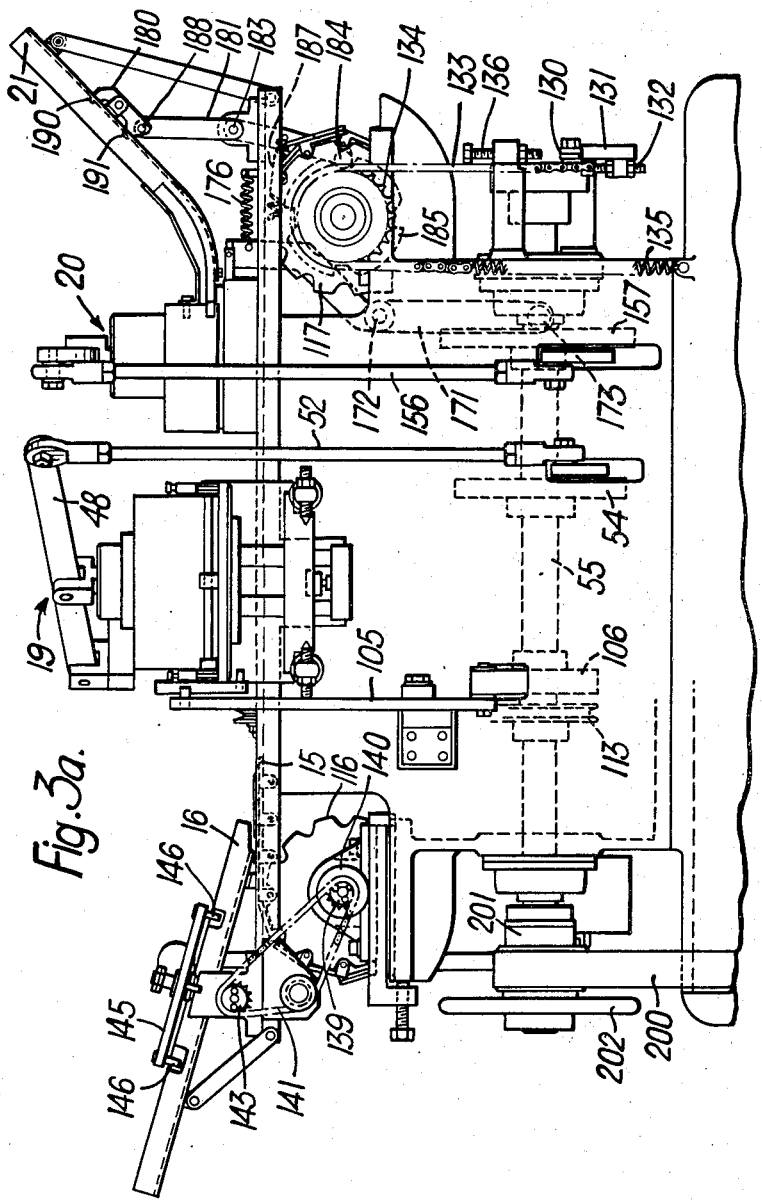
Inventor
FRANK EDWARD MONKCOM
By Bacon & Thomas
Attorneys Dec. 24, 1963   F. E. MONKCOM   3,114,993
FOIL CUTTING MACHINES
Filed Nov. 14, 1960   6 Sheets-Sheet 4

Inventor
FRANK EDWARD MONKCOM
By Bacon & Thomas
Attorneys

Dec. 24, 1963     F. E. MONKCOM     3,114,993
FOIL CUTTING MACHINES
Filed Nov. 14, 1960     6 Sheets-Sheet 5
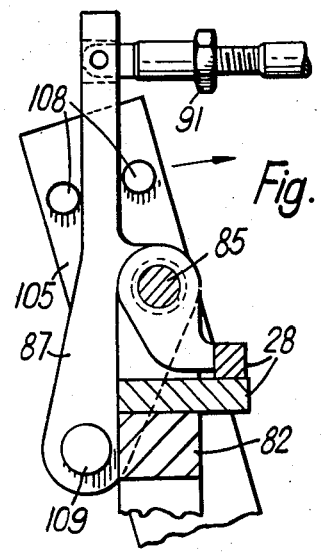
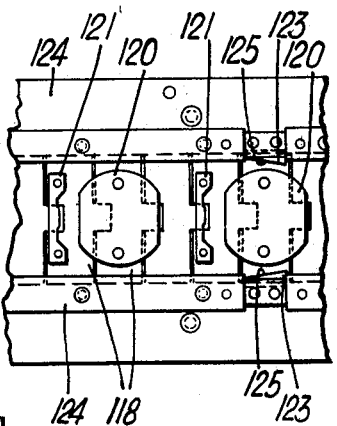
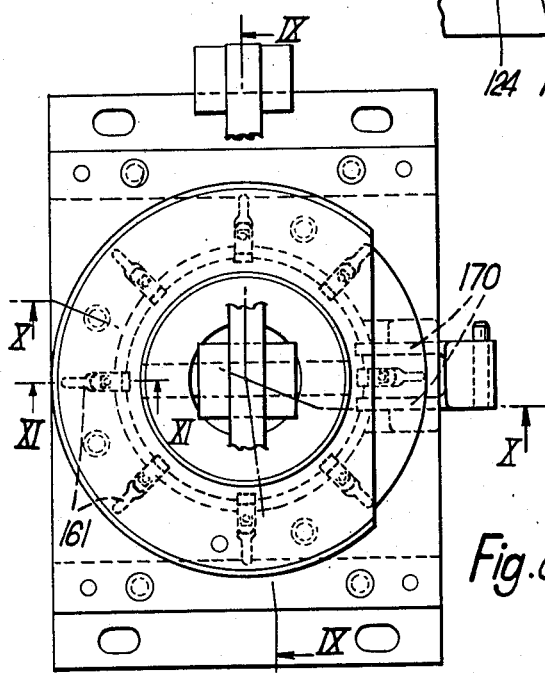
Inventor
FRANK EDWARD MONKCOM
By Bacon & Thomas
Attorneys

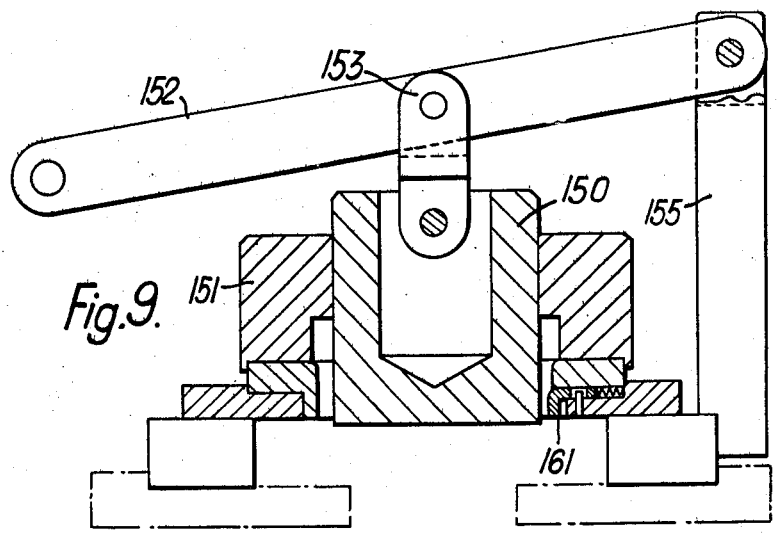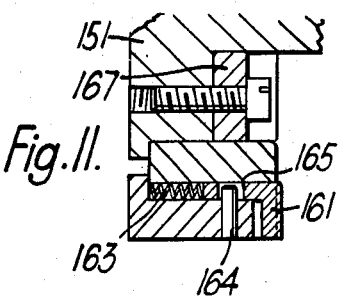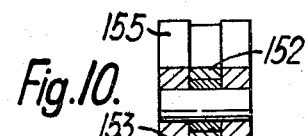

United States Patent Office 3,114,993
Patented Dec. 24, 1963

3,114,993
FOIL CUTTING MACHINES
Frank Edward Monkcom, Chiswick, London, England, assignor to Chiswick Products Limited, London, England, a British company
Filed Nov. 14, 1960, Ser. No. 69,024
Claims priority, application Great Britain Nov. 25, 1959
25 Claims. (Cl. 53—129)

This invention relates to a foil-cutting machine for producing pieces of foil of desired shape, and more particularly to a foiling and lidding machine, that is, a machine which applies said pieces of foil to containers and then applies lids to the containers. The foil will generally be metal foil, but paper, e.g. waxed paper or thin flexible plastic sheeting such as, for example, polythene sheeting can be used.

It has been found that in using conventional press tools on a single layer of foil, since the foil is so thin, that unless the dies are extremely accurate, the foil is not cut but slips between the cutting edges of the dies. Even with extremely accurate dies, which introduce the attendant difficulties of aligning them, it has been found that only a few pieces of foil can be cut before the machine functions improperly.

It is one object of the invention to provide a foil-cutting machine which overcomes the above disadvantages and which is suitable for use in a machine for applying the pieces of foil to containers.

According to the invention, there is provided a foil cutting machine for producing pieces of foil of desired shape comprising means for advancing a continuous strip of foil through the machine, gripping means for maintaining said strip of foil taut over a portion of its length, a toothed cutter, and means for effecting relative movement between the cutter and said taut portion of foil, the tooth or teeth of said cutter in operation engaging the surface of the taut foil so as first to penetrate through it and then cut from it a piece of foil of desired shape.

By the expression "a toothed cutter" we mean a cutter having one or more pointed teeth extending from the forward face of the cutter, the forward and rearward edges of the tooth or teeth together defining a closed i.e. a continuous cutting edge around the cutter which when the forward face of the cutter is viewed corresponds to the desired outline of the pieces of foil.

The reason why a sharp continuous planar cutter blade is not used is that such a blade cannot penetrate the foil easily and would therefore tend to cause the foil to break irregularly, particularly in the case of very thin foil. With the present method of cutting the foil, it is possible to use a thinner foil than that conventionally used.

A further advantage of this method of cutting the foil is the ease with which a cutter can be made for cutting pieces of foil of virtually any shape, compared with the difficulties and expense that would be encountered in making dies for cutting complicated shapes.

For intermittent movement of the foil, preferably the advancing means comprises a reciprocable carriage having at least one pair of co-operable clamps between which in operation the strip of foil is disposed, said clamps serving, as the carriage moves in one direction, to advance the strip of foil through the machine, and in the other direction, to release the foil.

Any suitable gripping means for maintaining the strip of foil taut over a portion of its length can be used. If the foil is thin, it will only be able to withstand a small amount of tension, so it is generally desirable for the gripping means to grip the foil and maintain it taut without actually tensioning it, the operation of the cutter then creating a very small amount of tension in the foil whilst it is being cut. Preferably the gripping means comprises two oppositely disposed members between which in operation the strip of foil is disposed, and to ensure that the gripping means grips the foil before the cutter operates, one of said members is resiliently mounted on the cutter so that as the cutter is moved towards the foil, the latter is first gripped between said two members so as to be maintained taut thereby whilst the piece of foil is cut from it.

Advantageously the reciprocable carriage has two pairs of co-operable clamps, and there are two pairs of holding clamps, one pair of reciprocable carriage clamps and one pair of holding clamps being disposed on the infeed and outfeed sides respectively of the cutter, the holding clamps being outwards of the carriage clamps.

Although any suitable method of drawing the foil from a supply roll can be used, preferably means are provided for mounting a supply roll of foil on the reciprocable carriage on the infeed side of the cutter in front of the pair of holding clamps on that side. Thus as the reciprocable carriage moves forward and the cutter and said holding clamps are raised, no foil is unwound from the supply roll which moves bodily with the carriage, the foil only being unwound as the reciprocable carriage performs a return movement with the holding clamps closed to hold the foil stationary, the roll itself being unwound by this movement. Any tendency of the supply roll to overrun can be reduced by means of a friction clutch.

Preferably means are provided for maintaining a small amount of tension in the cut strip of foil after it has left the cutter since this ensures that the strip of foil is taut at least on the outfeed side of the cutter, and it has the advantage that if during each cycle of operation of the machine, for a brief moment the strip of foil is not gripped anywhere along its length, the small amount of tension straightens any misalignment in the strip of foil.

The machine may be adapted to apply the cut pieces of foil directly to containers by providing the machine with conveying means for feeding containers thereto, said cutter serving, after a piece of foil has been cut, to apply the cut piece of foil to a container on the conveying means.

It is preferred to provide the conveyor with spaced locating means, there being disposed adjacent the conveyor resilient restraining members which serve in operation to locate each container accurately against respective locating means.

Preferably the machine includes lidding means which serves in operation to apply lids to containers on the conveying means after foil has been applied to them. Any suitable lidding means may be used, but preferably, the lidding means comprises a hollow member having an opening facing the conveying means and an opening in a side wall thereof through which lids can be inserted into the member, retaining means disposed within the member for preventing lids inserted therein from falling freely through said opening, and a plunger which serves during each operating stroke thereof to urge a lid through the opening and onto a container on the conveying means.

Figure 5:
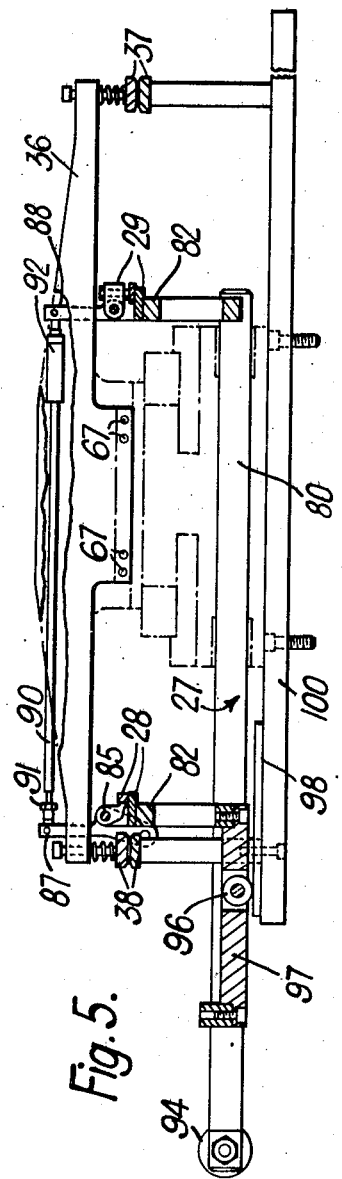
Figure 6:
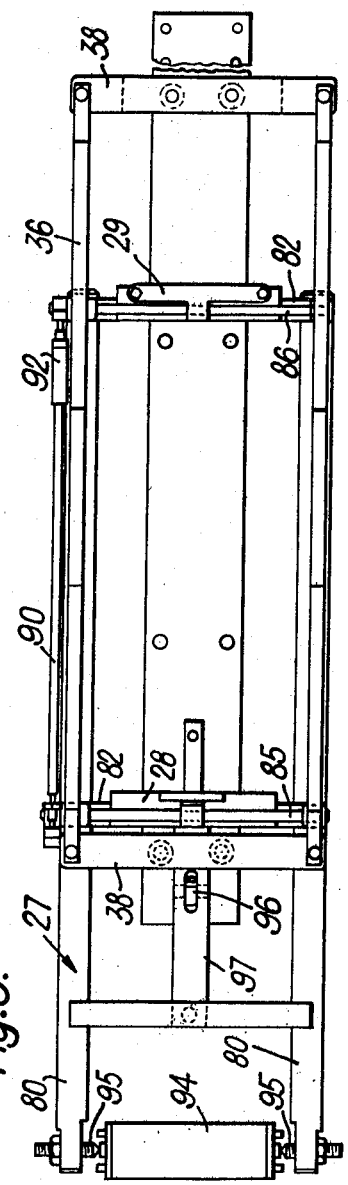

There will now be described by way of example only, one preferred embodiment of the invention with reference to the accompanying drawings in which:

FIG. 1 is a perspective view of a foiling and lidding machine according to the invention, FIGS. 2a and 2b are diagrammatic views of the foil cutting mechanism of the machine, FIG. 3a is a side elevation of the machine, FIG. 3b is a plan view of a portion of the conveyor of the machine, FIG. 4 is a cross-sectional view of the cutter of the machine, FIGS. 5 and 6 are respectively a side view, partly in cross-section, and a plan view, showing details of foil advancing means associated with the foil cutting mechanism, FIG. 7 is an enlarged view of a detail of FIG. 5, FIG. 8 is a plan view of a lidding device of the machine, FIG. 9 is a cross-sectional view on the line IX—IX of FIG. 8, FIG. 10 is a cross-sectional view on the line X—X of FIG. 8, and FIG. 11 is an enlarged cross-sectional view on the line XI—XI of FIG. 8.

With reference to FIG. 1, leading to the infeed end of an endless conveyor 15 there is a guide chute 16 for guiding filled circular tin containers on to the conveyor. Further along the machine frame 17 and extending transversely of the conveyor is the foil cutting mechanism 19, and beyond the latter, there is a lidding device 20 to which a guide chute 21 is connected for feeding lids thereto.

A brief description of the operation of the foil cutting mechanism will now be given with reference to the diagrammatic FIGS. 2a and 2b. The path of foil is indicated by the reference 25, and FIG. 2a shows the start of a foil advancing movement, and FIG. 2b shows the actual cutting operation. In FIG. 2a, a reciprocable carriage 27 having two pairs of cooperating clamps 28, 29 which grip the foil therebetween, is being advanced, and since the foil is not gripped elsewhere, the foil moves with the carriage 27. At the end of the advancing movement, the clamps 28, 29 of the reciprocable carriage open and the carriage begins its return movement. Before the clamps 28, 29 open however, a cutter 32 having a plurality of teeth to form a continuous cutting edge commences a downward movement from the position shown in FIG. 2a to the position shown in FIG. 2b, and this movement is transmitted to a plate 34 by way of springs 33, the plate 34 being rigidly connected to a frame 36. This causes the foil to be gripped between the two plates 34, 35 and between two pairs of holding clamps 37, 38, the lower plate 35 and the lower ones of the clamps 37, 38 being fixedly mounted, and the cutter 32 then first penetrates and at once then cuts through the foil and pushes the cut piece of foil through an aperture 40 extending through the plate 35. Finally the cutter rises again for the start of a further foil advancing movement as illustrated in FIG. 2a.

A detailed description of the foil cutting mechanism 19 will now be given with reference to FIGS. 1, 3a, 4, 5, 6 and 7, parts corresponding to those shown in FIGS. 2a and 2b having the same reference numerals.

In FIG. 4, the cutter 32 is reciprocably mounted in the bore 45 of a housing 46, the cutter being movable by a lever 48 pivotally connected thereto by a link 49, one end of the lever being pivotally mounted in a fixed support 51 and the other end of the lever being connected to a linkage 52 (FIG. 3a) which is operable by a cam 54 on the main shaft 55 of the machine.

At the lower end of the cutter 32, a cutter head 57 is held in position by a bolt 58, and the hollow interior of the cutter head is filled with a disc 59 of sponge rubber. A passageway 60 extends through the disc 59, the cutter head 57 and the body of the cutter to a bore 61 so that there is no possibility of a piece of foil sticking to the end of the cutter head due to suction. A rectangular plate 34 has a circular bore in which the cutter head is slidable, and circumferentially equally spaced round said bore, three bolts 64 (only one of which is shown) are screwed into the plate 34, the shafts of the bolts extending through holes in a flange 65 of the cutter. Interspersing the bolts 64 are three springs 33 (only one of which is shown) which tend to urge the plate 34 and the flange 65 apart. The frame 36 is connected on each side to the end faces of the rectangular plate 34, as indicated by the screws 67 (FIG. 5). The plate 35 in which the bore 40 is provided forms part of the housing 46 of the cutter, and slots 68 are provided in opposite walls of the housing to allow the strip of foil to pass through, one of these slots being shown clearly in FIG. 1. The supporting members 69 are also shown in FIG. 1.

It will be appreciated that as the lever 48 raises the cutter 32 from the position shown in FIG. 4, at first the springs 33 expand so that the plates 34, 35 still co-act, but eventually, the flange 65 engages the bolt heads 70 of the bolts 64 so as to lift the plate 34 away from the plate 35 and to release foil gripped therebetween (see FIG. 2a). An aperture 71 is provided in the housing 46 above each of the bolts 64 to allow them to be adjusted.

For advancing the strip of foil past the cutter, reference is made to FIGS. 1, 5 and 6. The reciprocable carriage 27 comprises two interconnected bars 80 which extend through and are slidably mounted in the machine frame 17. Two plates 82 which are apertured for lightness in weight are secured between the bars 80 and support the pairs of clamps 28, 29, the lower clamp of each pair being fixedly mounted, and the upper clamp of each pair being secured to a pivotal shaft 85 or 86, each of the two shafts 85, 86 being rotatable by a lever 87, 88 respectively fixedly mounted thereon. The levers 87, 88 are interconnected by a link 90 whose effective length can be varied by a screw fitting 91 (see FIG. 7) and which incorporates a spring connection 92 which resiliently interconnects the two separate ends of the link 90. The link 90 ensures that both pairs of clamps 28, 29 operate together, and the spring connection 92 avoids the need for making fine adjustments to the screw fitting 91. At one end of the bars 80, a spool 94 is provided for a supply of foil, which spool is mounted between adjustable centres 95. Since the weight of foil on the spool may be considerable, additional support is provided for this end of the reciprocable carriage by means of a rotatable roller 96 mounted in a member 97 connected to the bars 80. A runway 98 for the roller 96 is provided on a fixed part 100 of the machine.

Also connected to the fixed part 100 are the lower ones of the pairs of holding clamps 37, 38, the upper ones being resiliently mounted on the frame 36. As shown only in FIG. 1, two brake shoes 104 are spring urged against the spool 94 to prevent it from freely rotating.

The reciprocable carriage is movable by means of a pivotally mounted arm 105 which is oscillatable by means of a cam 106 mounted on the main shaft 55 of the machine. Two pins 108 project from the upper end of the arm 105, which as shown in FIG. 7, embrace the lever 87. Thus as the arm moves to the right as shown in FIG. 7, the pair of clamps 28 (and also the pair of clamps 29) close and the reciprocable carriage moves forward to advance the strip of foil through the machine, the spool 94 moving with the carriage. At the end of this advancing movement, the upper end of the arm 105 changes its direction of movement and the lever 87 rotates until a stop 109 mounted on it abuts the plate 82. The pairs of clamps 28, 29 are then open and the reciprocable carriage commences to return to its starting position again. During this return movement clamps 37 and 38 are closed and plates 34 and 35 also grip the foil so that return movement of carriage 27 causes more foil to be drawn from roll 94.

It is to be noted that the foil as fed through the machine enters the space below the cutter from the side adjacent the supply roll and passes therethrough to the opposite side. As used herein, the term "infeed side" refers to that side adjacent the supply roll and the "outfeed" side refers to the opposite side of the machine.

As the foil leaves the pair of holding clamps 37 after it has passed through the cutter, it passes over a sponge plastic roller 110 (FIG. 1) which is continuously rotated by means of a pulley belt 111 passing round a pulley 112 on the shaft of the roller 110 and a pulley 113 (FIG. 3a) on the main shaft of the machine.

As already stated, the movement of circular tin containers through the machine is effected by means of the endless conveyor 15. This conveyor, as shown in FIG. 3a, passes round two sprockets 116, 117, and comprises a plurality of pivotally interconnected plates 118 (FIG. 3b) on some of which base locating plates 120 are mounted, and on others of which back locating plates 121 are mounted. The tin containers for use with the machine have a diameter slightly greater than that of the plates 120, and a circular depression is formed in the base of the containers which enables them to be loosely located on the base locating plates 120. For applying a piece of foil or a lid to a container it must first be accurately located, and this is achieved by means of the plates 121 and pairs of oppositely disposed restraining members 123, one pair of which is provided beneath the cutter 32 and another pair of which is provided beneath the lidding device 20. A third pair of members 123 is provided at the infeed end of the conveyor 15 which locates tin containers as they are fed on to the conveyor correctly over the plates 120. The members 123 are resiliently urged outwardly of the stationary guide walls 124 of the conveyor, and their inclined edges 125 restrain the containers as they pass on the conveyor and urge them into contact with the back locating plates 120. The latter are provided with mutually inclined contact walls against which the containers are urged so as to occupy a predetermined central position on the conveyor.

Drive for the conveyor 15 is derived from the main shaft 55 of the machine by means of an eccentric roller cam 130. This cam 130 is arranged to oscillate a lever 131, the remote end of which as seen in FIG. 3a is pivotally mounted, and the near end of which is connected by bolt 132 to a chain 133 which passes over a sprocket 134 to an extension spring 135. The sprocket 134 is connected to the shaft of the conveyor sprocket 117 by a one-way clutch, so that as the lever 131 oscillates, the chain 133 moves backwards and forwards round the sprocket 134 and causes the conveyor sprocket 117 to move intermittently clockwise as seen in FIG. 3a. An adjusting bolt 136 limits the amount by which the end of the lever 131 can rise, and changing the setting of this bolt varies the stroke of the chain 133, and hence the amount by which the conveyor 15 advances during each intermittent movement.

In order to ensure accurate indexing of the conveyor, the shaft on which the conveyor sprocket 116 is mounted extends through a brake device 140 which exerts a friction force on the shaft so as to oppose free rotation thereof.

The movement of the conveyor is utilized to drive a feed device for feeding filled containers from the guide chute 16 onto the conveyor. This is done by mounting a chain sprocket 139 on the shaft on which the conveyor sprocket 116 is mounted, a chain 141 connecting the sprocket 139 to a sprocket 143 which is in driving driving connection with a wheel 145 by bevel gears (not shown). Equally spaced round the circumference of the wheel 145 are four depending pins 146, and the circumference overlaps slightly more than half the width of the guide chute 16 so that during each advancing movement of the conveyor 15, the wheel 145 rotates to release one container entrained between the pins 146 onto the conveyor. A second similar feed device 148 is shown in FIG. 1 which serves to feed a container from a guide chute (not shown) to the wheel 145 each time the wheel 145 releases a container, the second feed device being necessary owing to the guide chute (not shown) leading to it being oblique to the guide chute 16. The operation of the wheel 145 causes a small amount of back movement of the containers held in the guide chute, and jamming might occur if this movement could not be transmitted past the angular junction between the guide chute (not shown) and the guide chute 16. To prevent undue damage to the machine should any jamming occur in the feed of containers to the conveyor, each wheel 145, 148 is driven by way of a coupling 144 (FIG. 1) which slips when its associated wheel is prevented from rotating. Each coupling 144 may comprise for example a pair of discs between which three or more ball bearings are located in cavities in the opposing faces of the discs, the cavities in one opposing face registering with the cavities in the other opposing face, one disc being mounted on its associated wheel while the other is non-rotatably but slidably mounted on a drive shaft concentric with that wheel, a spring disposed on this shaft urging the slidable disc into engagement with the other disc mounted on said associated wheel.

A detailed description of the lidding device 20 will now be given with reference to FIGS. 1, 3a, 8, 9, 10 and 11. The lidding device comprises a plunger 150 which is reciprocable in a hollow housing 151 by a lever 152 to which the plunger is pivotally connected by a link 153, one end of the lever being pivotally mounted on a fixed support 155 and the other end being connected to a linkage 156 which is operable by a cam 157 (FIG. 3a) on the main shaft 55, so that as the latter rotates, the lever 152 oscillates.

As indictaed in FIG. 10, the housing 151 has an opening 160 in the side wall thereof to which the guide chute 21 leads. Beneath the level of this opening, eight uniformly spaced retaining fingers 161 (FIGS. 8, 9) are disposed around the interior of the housing 151. As shown clearly in the enlarged view of FIG. 11, the fingers 161 are L shaped and are urged so as to project into the interior of the housing 151 by springs 163, the fingers 161 being retained by locating pins 164 which extend into apertures 165 which are so dimensioned as to allow the fingers limited freedom of movement radially of the housing. A magnet 167 is bolted in position in the housing opposite the opening 160 therein, and serves to prevent lids fed into the housing from the guide chute 21 from rebounding out again.

Beneath the guide chute 21, two interconnected catch fingers 170 are reciprocably mounted and project into the interior of the housing 151. These fingers 170 are operable by a lever 171 (FIG. 3a) which is pivotally mounted at 172 and carries a roller 173 at its lower end which engages the rear face of cam 157. This rear face also serves as a cam and is so shaped that when the plunger 150 rises after a lidding movement, the fingers are moved into the interior of the housing to cause any container which adheres to the plunger 150 due to suction or a thin oil film for example, to drop off onto the conveyor. A tension spring 176 biases the lever 171 so that the roller 173 always engages the cam 157.

A feed control device for controlling the feed of lids into the housing 151 from the guide chute 21 comprises a pivotally mounted escapement catch 180 connected to one end of a lever 181. The lever 181 is pivoted at 183 and at its other end carries a roller 184 which is urged into contact with a cam 185 by means of a spring 187, the cam 185 being mounted on the same shaft as the conveyor sprocket 117 so as to be rotatable therewith. The pin 188 which is mounted on the escapement catch 180 projects into a short slot (not shown) extending along the lever 181 so that as the conveyor 15 advances, the cam 185 rotates and moves the lever 181 which in turn rotates the catch 180 accordingly. When the roller 184 is in the position shown on the cam 185, the projection 190 of the catch 180 projects upwardly into the path of lids in the guide chute 21, whereas when the roller 184 engages the top of a raised portion of the cam 185, the projection 190 is withdrawn from the guide chute and the projection 191 instead projects upwardly into the path of lids in the guide chute 21. Thus at the start of an operation, as a lid comes down the chute 21 with the interior of the lid facing downwards, the forward edge of the lid first engages the projection 190.

When this projection 190 is withdrawn, the lid again moves until its forward edge engages the projection 191. The lid has a greater diameter than the distance between the two projections 190, 191, so that when the projection 190 rises again, the lid moves a short distance until the projection 190 engages the interior of the rearward edge of the lid. Projection 190 is then withdrawn and projection 191 rises and in turn engages the interior of the rearward edge of the lid. Finally the lid is released as the projection 191 is withdrawn. It should be noted that the interior of the rear edge of the following lid is then engaged by the projection 190, so that after projection 191 has been raised and lowered again, the said following lid is released. Thus with every quarter revolution of the cam 185 from the position shown in FIG. 3a, a lid is released into the lidding device 20. This lid then enters the interior of the housing 151 and drops until it is held by the fingers 161. The plunger 150 is then lowered, and if the lid is not held horizontally by the fingers 161, the plunger 150 first moves it so that it is held horizontally, and then forces it out of the bottom of the lidding device and onto a container below to which a piece of foil has been applied. If, when the plunger begins to rise again, the lidded container adheres to it, the pair of fingers 170 catch the top of the container and cause it to drop onto the conveyor.

In order to give a clear indication of the overall operation of the machine, the events that occur in each half of a cycle of the machine, i.e. during each half revolution of the main shaft 55 are listed below:

*First Half Revolution*

(1) The sprocket 134 rotates to cause the conveyor sprocket 117 to rotate through 90° and to advance the conveyor 15 a distance equal to the spacing between two adjacent plates 121, i.e. the pitch of the conveyor: this causes the release of one filled container from the guide chute 16 onto the conveyor and the release of one lid from the guide chute 21 into the lidding device 20, the plunger 150 being stationary at the top of its stroke.

(2) The cutter 32 is stationary at the top of its stroke and the plates 34, 35 are separated and the holding clamps 37, 38 are separated.

(3) The reciprocable carriage of the foil cutting mechanism is advanced, the gripping clamps 28, 29 being closed, and the strip of foil is advanced through the machine.

*Second Half Revolution*

(1) The conveyor is stationary.

(2) The cutter 32 descends, closes the plates 34, 35 and the holding clamps 37, 38, and then cuts a piece of foil from the strip of foil and presses the piece onto a filled container which has been accurately located below it on the conveyor by the associated pair of restraining members 123, the resilient disc 59 pressing the piece of foil into good contact with the contents of the container: the cutter finally rises to cause the release of the strip of foil again.

(3) The plunger 150 of the lidding device 20 descends and applies the lid which has been fed into it to a container which has been accurately located below it by its associated pair of restraining members 123: the plunger finally rises and the catch fingers are reciprocated once inwardly and outwardly of the housing 151 to release the lidded container onto the conveyor should it be adhering to the plunger 150.

During operation of the machine, the main shaft 55 is driven continuously by a pulley belt 200 from a motor (not shown). A clutch assembly 201 is provided which besides enabling the drive from the pulley belt to the shaft to be disconnected, enables the shaft 55 to be brought to rest at the start of a cycle of operation of the machine, i.e. with the cutter 32 and the plunger 150 at the top of their strokes. A handwheel 202 is also provided for moving the shaft 55 by hand for purposes of adjustment. Containers which have been lidded are allowed to drop off the end of the conveyor into a delivery chute, only the part 204 of which is shown in FIG. 1.

The axis of the cutter 32 is separated from the axis of the plunger 150 by a distance equal to twice the pitch of the conveyor 15, and to ensure that this spacing is accurate, the members 69 supporting the cutter housing 46 are mounted on the machine frame 17 in such a way as to be capable of limited adjustment along it. If desired, provision may also be made for making the lidding device adjustable over a limited distance along the machine frame.

We have found that the machine that has been described can produce 65 containers per minute each having a piece of foil and a lid applied thereto, the thickness of the foil being 0.012 mms. The operation of the machine is therefore extremely rapid, and enables a very large reduction to be made in the cost of foiling and lidding containers as compared with the cost of performing these operations manually.

It will be appreciated that many modifications and variations may be made to the embodiment that has been described without departing from the scope of the invention.

What I claim is:

1. In a machine for cutting out a disc of a thin foil from a continuous strip of foil and for applying such disc to a filled container, said machine having a toothed cutter movable relative to the foil for cutting out and applying a disc to a container and gripping means serving to hold the foil taut during a cutting operation; a carriage movable to and fro transversely with respect to the movement of the cutter which carriage has at least one pair of cooperating clamps between which the strip of foil is disposed, means for closing said clamps as the carriage moves in one direction and when the gripping means are open, to advance the strip of foil through the machine and to open said clamps as the carriage moves in the other direction to release the foil.

2. A machine as claimed in claim 1 in which said gripping means comprises two oppositely disposed members between which the strip of foil is disposed, one of said members being resiliently mounted on the cutter so that as the cutter is moved towards the foil, the latter is first gripped between said two members so as to be maintained taut thereby while the piece of foil is cut from it.

3. A machine as claimed in claim 1 wherein said gripping means include at least one pair of cooperable holding clamps having a movable clamp portion which is connected to and movable with the cutter so that as the latter is moved toward the foil, the movable clamp portion engages and presses the foil against the other clamp of the pair before the cutter cuts the foil which is released by the holding clamps as the cutter is moved away from the foil after the completion of a cutting operation.

4. A machine as claimed in claim 3 wherein the reciprocable carriage has two pairs of cooperating clamps, two pairs of holding members on said machine, one pair of reciprocable carriage clamps and one pair of holding members being disposed on the infeed and outfeed sides respectively of the cutter, the carriage clamps being between the holding members.

5. A machine as claimed in claim 4 wherein means are provided for mounting a supply roll of foil on the reciprocable carriage on the infeed side of the cutter in front of the pair of holding members on that side.

6. A machine as claimed in claim 4 wherein each of the two pairs of clamps on the reciprocable carriage comprises a clamp which is fixedly mounted on the carriage, and a cooperating clamp which is fixedly mounted on a shaft rotatably mounted in the carriage, each of the two shafts being rotatable by a lever fixedly mounted thereon, the levers being interconnected so that both pairs of clamps operate simultaneously.

7. A machine as claimed in claim 6 wherein the interconnection between said levers is resilient.

8. A machine as claimed in claim 6 wherein the carriage is reciprocable by means of a pivotally mounted oscillatable arm, one end of which engages one of said levers and movable thereby so as to close the reciprocable carriage clamps as the arm moves the carriage forward and advances the strip of foil through the machine, said end serving further to open the reciprocable carriage clamps as the arm moves the carriage rearwardly.

9. A machine as claimed in claim 8 wherein the oscillatable arm and the cutter are operatively connected to the same drive means so that they operate in predetermined phase relationship.

10. A machine as claimed in claim 1 including means for maintaining tension in the cut strip of foil after it has left the cutter.

11. A machine as claimed in claim 1 said gripping means is arranged to grip an area completely surrounding the cutter.

12. A machine as claimed in claim 1 including conveying means for feeding containers to the machine below said cutter, said cutter having means movable therewith to engage the cut disc and push the same onto a container on the conveying means therebelow.

13. A machine as claimed in claim 12 including means for operating the conveying means intermittently so that containers conveyed thereby are stationary when foil is applied to them.

14. A machine as claimed in claim 13 in which the driving connection between said drive means and the conveying means comprises a chain, one end of which is connected to an extension spring and the other end of which is reciprocable by the drive means, the chain passing over a sprocket which is connected by a one-way clutch to a drive shaft for the conveying means.

15. A machine as claimed in claim 12 including lidding means for applying lids to containers on the conveying means after foil has been applied to them.

16. A machine as claimed in claim 15 in which said lidding means comprises a hollow member having an opening facing the conveying means and an opening in a side wall thereof through which lids can be inserted into the member, retaining means disposed within the member for preventing lids inserted therein from falling freely through said opening, and a plunger which serves during each operating stroke thereof to urge a lid through the opening and onto a container on the conveying means.

17. A machine as claimed in claim 16 in which said drive means also operates said plunger.

18. A machine as claimed in claim 17 in which catch means are provided which are movable into the interior of the hollow member by said drive means to release any lidded articles which adhere to the plunger onto the conveying means.

19. A machine as claimed in claim 18 in which said catch means comprises a pair of reciprocable fingers.

20. A machine as claimed in claim 16, in which said retaining means comprise a plurality of spring-urged fingers which project into the interior of the hollow member.

21. A machine as claimed in claim 16 including a feed chute for feeding lids through the side wall opening into the hollow member, and a feed control device associated with said chute which serves in operation to deliver a lid to the member at regular intervals.

22. A machine as claimed in claim 21 in which the hollow member is provided with a magnet which is so disposed and arranged as to prevent lids rebounding onto the chute after they have entered the hollow member.

23. A machine as claimed in claim 21 in which the feed control device is operatively associated with the conveying means.

24. In a machine for cutting out a disc of a thin foil from a continuous strip of foil and for applying such disc to a filled container, said machine having a toothed cutter movable relative to the foil for cutting out and applying a disc to a container and gripping means serving to hold the foil taut during a cutting operation; a carriage movable to and fro transversely with respect to the movement of the cutter which carriage has at least one pair of cooperating clamps between which the strip of foil is disposed, means for closing said clamps as the carriage moves in one direction and when the gripping means are open, to advance the strip of foil through the machine and to open said clamps as the carriage moves in the other direction to release the foil, endless conveyor means for feeding containers to the machine below said cutter, said cutter having means movable therewith to engage the cut disc and push the same onto a container on the conveying means, a feed device operatively associated with the conveyor and which serves to feed containers thereto so that they are positioned in spaced relationship along the conveyor.

25. A machine as claimed in claim 24 in which the conveyor is provided with spaced container engaging and locating means, there being disposed adjacent the conveyor resilient restraining members which serve in operation to locate each container accurately against respective locating means.

References Cited in the file of this patent
UNITED STATES PATENTS
1,377,279  Rosengren _____ May 10, 1921